United States Patent [19]
Holmes et al.

[11] Patent Number: 4,755,664
[45] Date of Patent: Jul. 5, 1988

[54] NIGHT VISION SYSTEMS

[75] Inventors: Roy H. Holmes, Tenterden; David G. Irwin, Corringham; David F. Waghorn, Bapchild, all of England

[73] Assignee: GEC Avionics Limited, England

[21] Appl. No.: 901,043

[22] Filed: Jul. 23, 1986

[30] Foreign Application Priority Data

Jul. 31, 1985 [GB] United Kingdom ............... 8519271

[51] Int. Cl.⁴ .................. H01J 31/50; H01J 40/14; G09G 3/02; H04N 5/58
[52] U.S. Cl. ....................... 250/213 VT; 340/705; 350/174; 358/161
[58] Field of Search ................ 350/174; 340/705; 358/161; 250/213 VT

[56] References Cited

U.S. PATENT DOCUMENTS

| | | | |
|---|---|---|---|
| 3,949,490 | 4/1976 | Derderian et al. | 350/174 |
| 4,209,691 | 6/1980 | Hunt | 250/213 VT |
| 4,410,841 | 10/1983 | Dusard et al. | 358/161 |
| 4,647,967 | 3/1987 | Kirschner et al. | 350/174 |

Primary Examiner—Stephen C. Buczinski
Attorney, Agent, or Firm—Kirschstein, Kirschstein, Ottinger & Israel

[57] ABSTRACT

A vehicle night vision system comprising a headgear mounted night vision goggle 11 incorporating an image intensifier which produces an intensified image of a scene forward of the goggle superimposed on a user's direct view of the scene through the goggle wherein the intensity of the image produced by the intensifier is reduced when the user views a vehicle interior display via the goggle to prevent interference with the user's direct view of the display through the goggle.

10 Claims, 4 Drawing Sheets

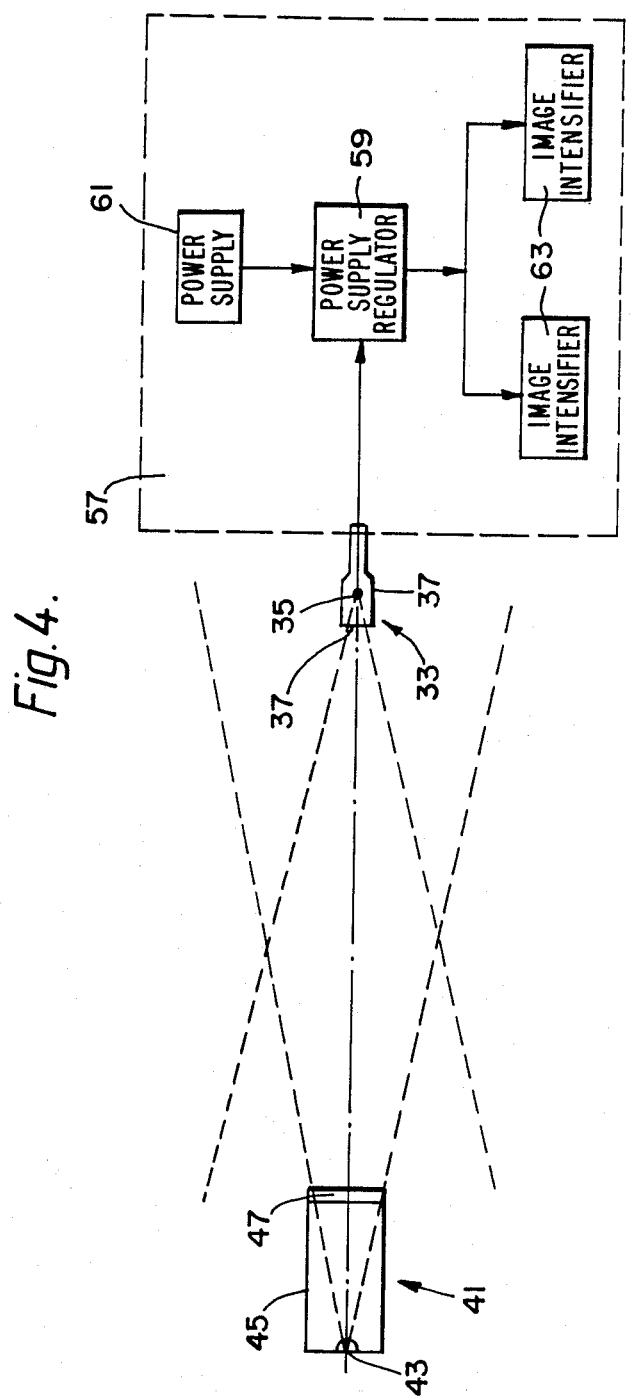

NIGHT VISION SYSTEMS

This invention relates to night vision systems for vehicles especially aircraft. More particularly the invention relates to such systems including a headgear mounted night vision goggle having a combiner eyepiece through which a wearer of the headgear is able to view a scene forward of the goggle and image intensifier means for projecting into the said eyepiece an intensified image of said forward scene for transmission via said eyepiece to an eye of the wearer.

One form of night vision goggle suitable for use in such a system is described in United Kingdom Patent Application No. 2144558A and U.S. patent specification No. 4563061. In that goggle there are two optical systems, one for each eye, each including an individual image intensifier and eyepiece. That particular goggle is therefore a binocular night vision goggle. However, in other systems the night vision goggle may be a biocular device, e.g. incorporating a single image intensifier the output of which is relayed to two eyepieces by way of a beam splitting prism, or a monocular device.

One problem which arises with vehicle night vision systems incorporating headgear mounted night vision goggles is that when the user averts his head from the scene through the vehicle windscreen to view a vehicle interior display the intensified image of the display presented to his eyes via the eyepiece tends to interfere with his direct view of the display through the eyepiece.

This problem can be especially acute in respect of the display presented by an aircraft head-up display, operating in a TV raster mode, at night, to produce an image of the forward scene from an infra-red camera carried by the aircraft.

The present invention seeks to eliminate or to mitigate this problem.

According to the present invention there is provided a night vision system for a vehicle comprising: a headgear mounted night vision goggle having a combiner eyepiece through which a wearer of the headgear is able to view a scene forward of the goggle and image intensifier means for projecting into the said eyepiece an intensified image of said forward scene for transmission via said eyepiece to an eye of the wearer; a viewing zone in the vehicle interior in which is presented a display to be viewed by a wearer of the headgear during the operation of the vehicle; a radiation source operable to emit radiation in a waveband substantially outside the visible portion of the spectrum; a sensor responsive to radiation emitted by said source and arranged so as to receive radiation from said source substantially only when the wearer is viewing said viewing zone through said goggle; and means for controlling the intensity of said intensified image in response to the output of said sensor so that when the sensor is receiving radiation from said source the intensity of said intensified image is reduced to a level sufficient not to interfere substantially with the helmet wearer's view of the viewing zone through said eyepiece.

One night vision system in accordance with the invention will now be described, by way of example, with reference to the accompanying drawings in which:

FIG. 4 is a diagram of an automatic shutdown circuit arrangement forming part of the system.

Figure 1:
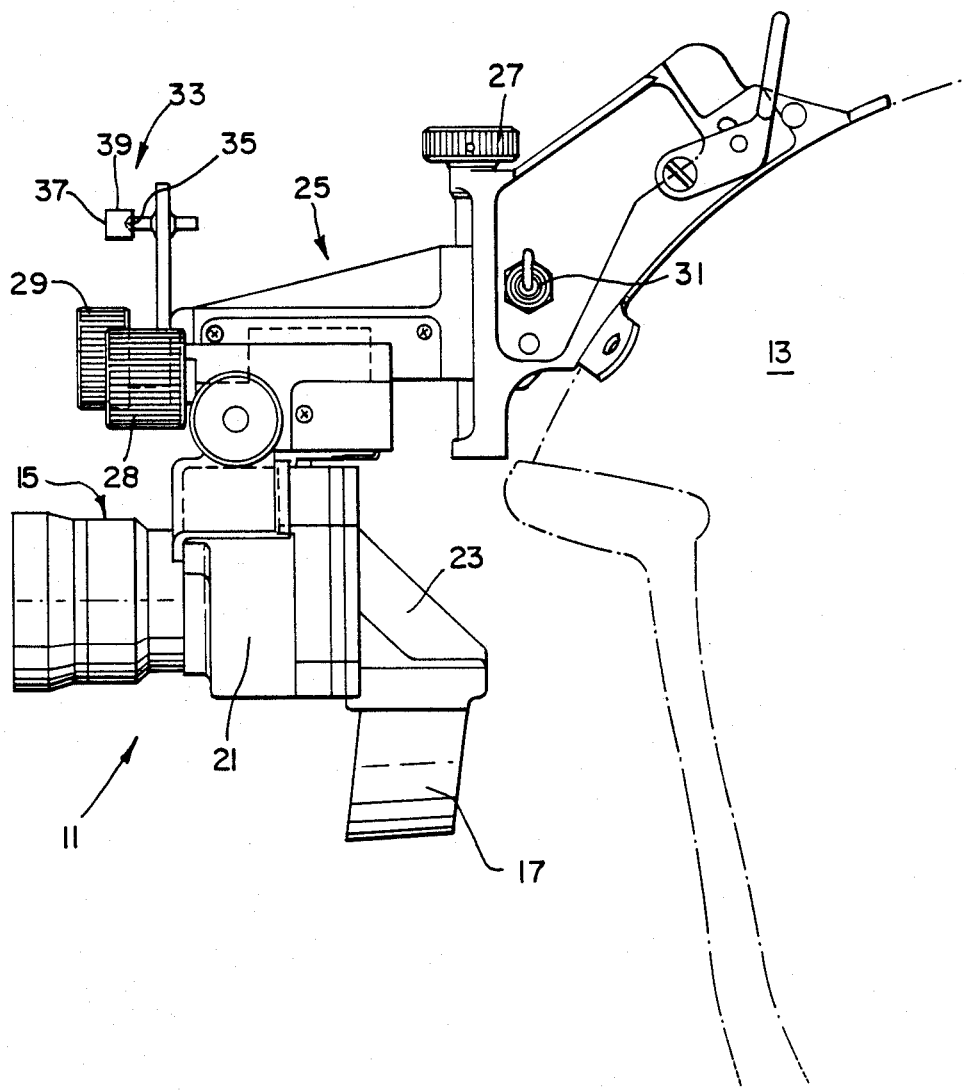
FIG. 1 is a side view of a headgear mounted night vision goggle forming part of the system.
Figure 2:
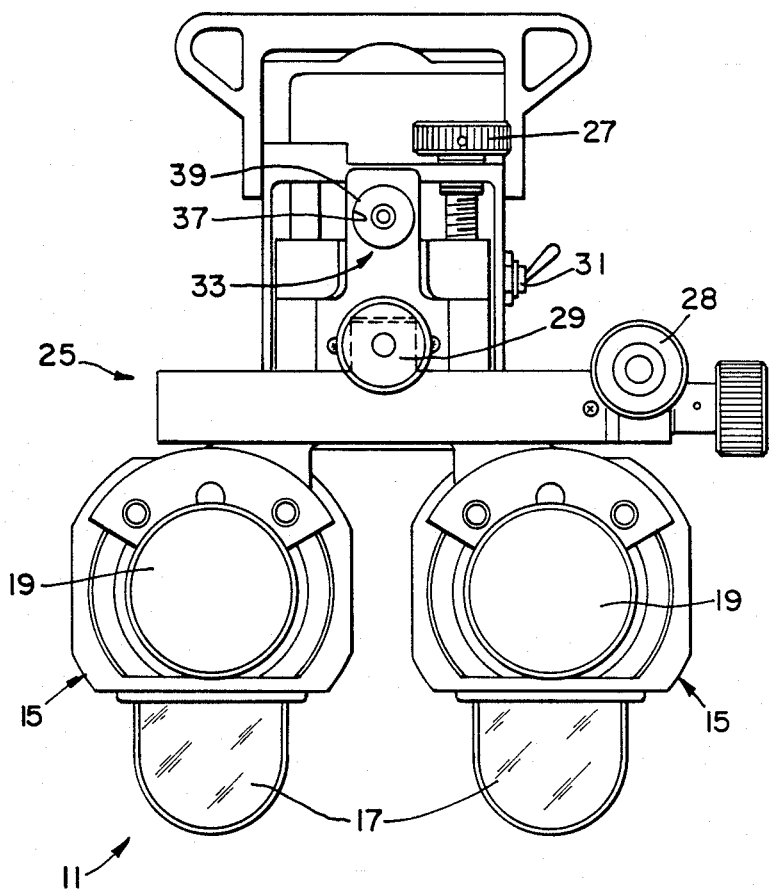
FIG. 2 is a front view of the night vision goggle.
Figure 3:
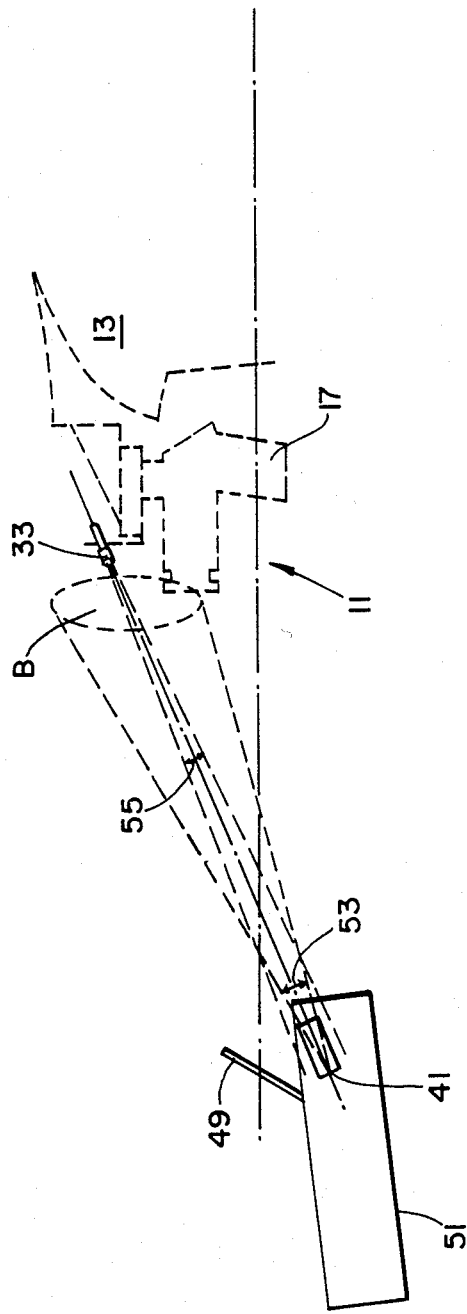
FIG. 3 is a diagram illustrating the disposition of the goggle of FIG. 1 and 2 in relation to a head-up display forming part of the system.

Referring to the FIGS. 1, 2 and 3 of the drawings, the system is intended for use by an observer in an aircraft and includes a night vision goggle 11 mounted on a helmet 13 worn by the observer.

The goggle 11 is of the binocular type, i.e. it comprises two independent viewing arrangements, one for each eye of the observer.

Each viewing arrangement comprises a frame 15 which supports an eyepiece 17 of light refractive material positioned in front of the observer's eye when the helmet 13 is being worn, and through which the observer has a direct view of the forward scene.

The frame 15 of each viewing arrangement further supports an optical projector comprising an objective 19 which receives light from the forward scene, an image intensifier (not visible) which is housed in a portion 21 of the frame behind the objective 19 and produces an intensified image of the forward scene as seen through the objective 19, and a roof prism (not visible), which is housed in a portion 23 of the frame behind the image intensifier and reflects the intensified image downwardly into the eyepiece 17. Within the eyepiece 17 the intensified image is internally reflected, exiting the eyepiece 17 at its aft surface to the observer's eye to provide the observer with an intensified image of the forward scene superimposed on his direct view of the forward scene through the eyepiece 17.

The two viewing arrangements are mounted on the helmet 13 by means of a mounting arrangement 25 which incorporates means operable by knobs 27, 28 and 29 whereby the lateral spacing between the viewing arrangements and their vertical position and spacing from the observer's eyes may be adjusted to suit the observer.

The mounting arrangement also carries components and circuitry associated with the goggle including a switch 31 for turning the image intensifiers on and off, and a radiation sensor 33.

The sensor 33 comprises a photo-transistor 35 sensitive to radiation of a wavelength which is invisible to the observer and to the image intensifiers in the goggle 11, e.g. infra-red radiation in the waveband 800 to 1400 nM, and which is directed so as to be incident on the sensor 33 via an aperture 37 defined by the opening at the forward end of a tube 39 projecting forwardly from the photo-transistor 35.

Another part of the night vision system comprises an infra-red radiation source 41 (see FIGS. 3 and 4) which emits radiation in the waveband to which the photo-transistor 35 is sensitive, and which in the present example comprises an incandescent lamp 43 which emits radiation rearwardly towards the sensor 33 along a tube 45 and through a filter 47 which fits in the rear end of the tube 45.

The sensor 33 and source 41 are arranged so that the sensor 33 receives radiation from the source 41 whenever the observer is viewing a viewing zone in the vehicle interior in which there is present a display which the observer may wish to view. In the present example the display is taken to be a display presented by the image combiner 49 of a head-up display unit 51, as shown in FIG. 3. To this end, as illustrated in FIG. 3, the source 41 is mounted on the head-up display 51 below the combiner 49, and the tube 45 extending from the incandescent lamp 43 is of such dimensions that infra-red rays from the lamp 43 are confined to a solid angle 53 which is not less than the solid angle subtended at the position of the lamp 43 by the sectional area of the sensor motion box, i.e. the volume in which movements of the sensor 33 occur in use, the sectional area being here represented, for simplicity, by a circle B. Conversely, the sensor 33 is receptive only to radiated infra-red rays in the said waveband and within a solid angle 55 not greater than the solid angle subtended by the area of the display presented by the image combiner 49 of the display unit 51 at the position of the photo-transistor 35.

Referring to FIG. 4, the sensing phototransistor 35, forms part of an automatic shut-down circuit arrangement 57 for the image intensifiers of the goggle 11. To this end the output of the phototransistor 35 is utilised to control a power supply regulator 59 connected between a power supply 61 for the image intensifiers 63 and the intensifiers 63 themselves.

In operation of the night vision system, when the observer is not viewing the display presented in the viewing zone, i.e. at the head-up display combiner 49, but is instead viewing, for example, the forward scene through the aircraft windscreen to one side or other of the combiner 49, the sensor 33 receives substantially no radiation from the radiation source 41. The output from the sensor 33 applied to the regulator 59 is then such that the full output of the power supply 61 is applied to the image intensifiers 63, and the intensifiers 63 provide the brightest image of the forward scene of which they are capable.

If the observer moves his head so as to view the display presented in the viewing zone i.e. in the present example by the combiner 49, for example, a TV raster mode display of the forward scene produced by a forward looking infra-red camera (not shown) carried by the aircraft, the sensor 33 receives radiation from the source 41. Consequently, the output of the sensor 33 applied to the regulator 59 changes in such a manner as to reduce the power supplied from the power supply 61 to the image intensifiers 63. As a result, the intensity of the image of the combiner display presented to the observer by the image intensifiers 63 via the eyepieces 17 of the goggle 11 is reduced to a level such as not to interfere with the observer's direct view of the combiner display through the eyepieces 17. In the absence of such reduction the light reaching the observer from the image intensifiers 63 via the eyepieces 17 would create a bright foggy condition observing the observer's direct view of the combiner display through the eyepieces 17.

It will be understood that by making the radiation emitted by the source 41 invisible not only to the observer's eyes, but also to the image intensifiers 63, the possibility of radiation from the source 41 interfering with the operation of the night vision goggle 11 either directly or via the image intensifiers 63 is eliminated. Such interference is otherwise quite likely to occur in some installations, particularly by virtue of reflection of the radiation. In the case of a two seat aircraft, such reflection can present a problem not only to the pilot in the front seat, but also to an observer in the rear seat using a night vision goggle, due to reflection from the aircraft cockpit canopy.

We claim:

1. A night vision system for a vehicle comprising: a headgear mounted night vision goggle having a combiner eyepiece through which a wearer of the headgear is able to view a scene forward of the goggle and image intensifier means for projecting into the said eyepiece an intensified image of said forward scene for transmission via said eyepiece to an eye of the wearer; a viewing zone in the vehicle interior in which is presented a display to be viewed by a wearer of the headgear during the operation of the vehicle; a radiation source operable to emit radiation in a waveband substantially outside the visible portion of the spectrum; a sensor responsive to radiation emitted by said source and arranged so as to receive radiation from said source substantially only when the wearer is viewing said viewing zone through said goggle; and means for controlling the intensity of said intensified image in response to the output of said sensor so that when the sensor is receiving radiation from said source the intensity of said intensified image is reduced to a level sufficient not to interfere substantially with the helmet wearer's view of the viewing zone through said eyepiece.

2. A system according to claim 1 wherein said sensor is mounted on said night vision goggle and said source is mounted in a fixed position relative to said viewing zone.

3. A system according to claim 2 wherein the radiation emitted by said source is confined to a solid angle which is not less than a solid angle subtended by an area of sensor motion at the position of said source, and said sensor is receptive only to radiation from said source within a solid angle not greater than a solid angle subtended by said viewing zone at the position of said sensor.

4. A system according to claim 1 wherein said source emits radiation in a waveband substantially invisible to said image intensifier.

5. A system according to claim 4 wherein said radiation is infra-red radiation.

6. A system according to claim 5 wherein said radiation is radiation in the waveband 800 to 1400 nM.

7. A system according to claim 1 wherein said sensor comprises a photo-transistor.

8. A system according to claim 1 wherein said source comprises an incandescent lamp associated with a filter.

9. A system according to claim 1 wherein said means for controlling the intensity comprises a power supply regulator connected between said image intensifier means and a power supply for said image intensifier means.

10. A system according to claim 1 wherein said display presented in said viewing zone is a display presented by a head-up display unit.

* * * * *